United States Patent [19]

Kerrigan

[11] Patent Number: 5,916,845
[45] Date of Patent: Jun. 29, 1999

[54] FERTILIZER COMPOSITION WITH PESTICIDE

[76] Inventor: Kurt J. Kerrigan, 1311 SE. 9th Ave., Pompano Beach, Fla. 33060

[21] Appl. No.: 08/916,118

[22] Filed: Aug. 22, 1997

[51] Int. Cl.[6] ............................... C05G 3/00; C05G 3/02
[52] U.S. Cl. .............................................. 504/101
[58] Field of Search ..................... 504/101, 110

[56] References Cited

U.S. PATENT DOCUMENTS

| | | | |
|---|---|---|---|
| 4,670,451 | 6/1987 | Uematsu et al. | 514/375 |
| 4,929,273 | 5/1990 | Takematsu et al. | 71/118 |
| 5,133,797 | 7/1992 | Mahara et al. | 71/28 |
| 5,346,920 | 9/1994 | Sakamoto et al. | 514/539 |

*Primary Examiner*—Jose' G. Dees
*Assistant Examiner*—Alton Pryor
*Attorney, Agent, or Firm*—Robert M. Downey, PA

[57] ABSTRACT

A fertilizer composition is provided in the form of a water soluble tablet structured to disintegrate and release into a stream of water at a predetermined rate, the composition including: N—P—K components of a desired ratio including 10.0 to 40.0% by weight of a nitrogen containing component, 0.0 to 40.0% by weight of a potassium containing component and 0.0 to 40.0% by weight of a phosphorus containing component; a binder in an amount of between 10.0% to 40.0% by weight; a phosphorothioate containing insecticide in an amount of between 0.05% to 2.0% by weight; and inert components, wherein the amount of components in the composition totals 100%.

1 Claim, No Drawings

FERTILIZER COMPOSITION WITH PESTICIDE

BACKGROUND OF THE INVENTION

1. Field of the Invention

The present invention relates to fertilizer compositions and, more particularly, to a dry, water dispersible tablet containing a fertilizer, an insecticide and a binding agent wherein the tablet is structured to disintegrate when subjected to a stream of water so that the composition is released into the water stream at a predetermined rate and concentration.

2. Description of the Related Art

Lawns, plants, botanicals and other plant life require watering, fertilizing and treatment with pesticides on a regular scheduled regime in order to maintain health and promote growth. Typically, watering, fertilizing and pesticide treatment are performed as three separate operations. In some instances, spray devices may be used on a garden hose to simultaneously water and fertilize plants and flowers, or to apply a diluted pesticide solution. During this application method, which is normally performed manually, the applied solution is quickly dispersed at uneven levels of distribution. Subsequent fertilization or pesticide treatment is often neglected, as this application process is time-consuming and expensive.

Small fertilizer pellets for slow release in the soil, near the base of a plant, are well known and widely used in the related field. However, pellets of this type do not provide insecticides for lawns, shrubs and botanicals. While liquid "weed and feed" compositions are known and used in spray applicators, they disperse quickly, consuming large amounts of chemicals with each application. It is, therefore, expensive, time-consuming and potentially hazardous to perform regular pesticide treatment of lawns, plants, and botanicals using the present application methods and compositions.

In spite of the numerous fertilizer products presently available on the market, there still exists a need for a fertilizer composition containing an insecticide which can be released slowly, at a controlled rate, into a stream of flowing water so that lawns, plants and botanicals can be simultaneously watered, fed with fertilizer, and treated for insects during regular watering operations.

SUMMARY OF THE INVENTION

The present invention provides a novel fertilizer composition which contains an insecticide and binding agent. The composition is structured for slow release into a stream of flowing water in accordance with a predetermined rate of disintegration and concentration level. In a preferred embodiment, the fertilizer composition is provided in the form of a dry, water dispersible tablet and is suited for use in the chemical application method set forth in my pending patent application Ser. No. 08/861,591 filed on May 21, 1997.

The fertilizer composition includes N—P—K components, provided at any desired ratio, as well as a binder agent and a phosphorothioate containing insecticide. In a preferred embodiment, the N—P—K components include ammonium sulfate in an amount of between 10 to 40% by weight of the composition, potassium sulfate in an amount of between 0 to 40% by weight of the composition and calcium phosphate monobasic in an amount of between 0 to 40% by weight of the composition. Ammonium phosphate may be substituted for ammonium sulfate and calcium phosphate monobasic to provide the desired N—P level. In a preferred embodiment, the binder agent is calcium carbonate, present in an amount of between 10 to 40% by weight of the composition, and the phosphorothioate containing insecticide is 0,0-diethyl 0-3,5,6-trichloro-2-pyridyl phosphorothioate and is present in an amount of between 0.05% to 2.0% by weight of the composition.

OBJECTS AND ADVANTAGES OF THE INVENTION

It is a primary object of the present invention to provide a fertilizer composition which contains an insecticide for application to various plant life including lawns, plants, and botanicals, wherein the three operations of watering, feeding (fertilizing) and treatment for insects is carried out simultaneously when applying the composition to the plant life.

It is a further object of the present invention to provide a fertilizer composition containing an insecticide which is structured for slow release of fertilizer and the insecticide, in accordance with a predetermined concentration and rate of release, into a stream of water during normal plant watering.

It is still a further object of the present invention to provide a fertilizer composition providing any desired N—P—K ratio and an insecticide for simultaneous watering, feeding and treatment of insects during watering of plant life.

It is yet a further object of the present invention to provide a fertilizer composition containing an insecticide wherein the composition is provided in a dry, soluble tablet which is useful in an irrigation system for automated, systematic watering, feeding and insect treatment of plant life on a scheduled cycle.

It is still a further object of the present invention to provide a fertilizer composition containing an insecticide and provided in a dry, water dispersible tablet and further including a binder component for controlling a rate of disintegration of the tablet and release of the fertilizer and insecticide when exposed to a stream of flowing water.

These and other objects and advantages of the present invention will be more readily apparent with reference to the following detailed description.

DETAILED DESCRIPTION OF THE PREFERRED EMBODIMENTS

According to the present invention, the above objects and advantages are achieved by combining desired levels of N—P—K fertilizer with an insecticide and binder component. The composition may further include a lubricating component containing vegetable oil as a mold release agent to facilitate release of manufactured tablets from the manufacturing molds. Other inerts for anti-sticking, slow disintegration and binding of the composition in a tablet form may be provided, as set forth below.

In a preferred embodiment, the N—P—K fertilizer includes ammonium sulfate, potassium sulfate, and calcium phosphate monobasic. Alternatively, ammonium phosphate can be substituted for ammonium sulfate and calcium phosphate monobasic to provide the desired nitrogen and phosphorus levels.

The insecticide used in the composition, in the preferred embodiment, is chlorpyrifos, 0,0-diethyl 0-3,5,6-trichloro-2-pyridyl phosphorothioate, manufactured and marketed under the tradenames Dursban, Lorsban, Pyrinex, and Dowco 179. At least some of these products are manufactured by Dow Chemical Corporation. Chlorpyrifos is an oily component and, when used in the composition of the present invention, appears to act as a binder as well as a water repellant to slow down the disintegration and dissolution of the pellet. Chlorpyrifos, according to studies conducted to date, is nonreactive and compatible with all of the minerals in the composition and, thus, affords a better storage shelf life than most liquid mixtures containing insecticides. While chlorpyrifos is used in one preferred embodiment, any phosphorothioate type insecticide is contemplated for use in the composition of the present invention.

The binder component of the composition is primarily comprised of calcium. In a preferred embodiment, calcium carbonate is used as the binder component. Huber 040-2007 manufactured by J.M. Huber Corporation is an example of a calcium carbonate product useful as the binder component in the composition. Other sources of ground limestone with the optimum particle size distribution can be substituted.

Lubritab, manufactured by Edward Mendell Co., is an example of a mold release agent useful in the composition to facilitate release of the manufactured tablet from a mold during manufacturing of tablets. Lubritab consists of partially hydrogenated vegetable and cottonseed oils. It also provides water repellency which slows down pellet dissolution. Other oils, particularly vegetable oil products, are useful as a mold release agent in the composition.

The following examples are presented in order to provide a fuller understanding of the composition of the present invention and the manner of preparation, and are, therefore, not intended to limit the scope of the invention.

EXAMPLE 1

| Component | Weight | Wt. Percent* |
|---|---|---|
| Ammonium Phosphate (Milled)** | 16.7 lbs | 25.0% |
| Potassium Sulfate (Sulfated Potash)*** | 16.7 lbs | 25.0% |
| Preblend (containing chlorpyrifos)**** | 20.7 lbs | 31.0% |
| Calcium carbonate (Huber 040-200) | 6.0 lbs | 9.0% |
| Lubritab (Milled) | 6.7 lbs | 10.0% |
| Total: | 66.8 lbs | 100.0% |

*For a variation of the N—P—K levels, the ammonium phosphate (or sulfate) and potassium sulfate (or carbonate) quantities may be varied to any percent relative to the values above (for example, the amount of ammonium phosphate could be 1 lb, 10 lbs or 50 lbs to form other N—P—K levels). The calcium carbonate and Lubritab may need to be adjusted to obtain optimum cohesion. No significant reaction between the phosphate, sulfate, or carbonate with the chorpyrifos is likely to occur with normal storage in the dry state. However, the preblend should be used immediately.
**Ammonium sulfate and calcium phosphate monobasic may be substituted for an equivalent amount of ammonium phosphate.
***Potassium carbonate may be substituted for an equivalent amount of potassium sulfate.
****Preblend: Consists of 58.0% triple superphosphate (milled), 41.0% Huber 040-200, and 1.0% liquid chlorpyrifos.

Preparation of the embodiment of Example 1 involves combining the ammonium phosphate, potassium sulfate, chlorpyrifos and calcium carbonate and tumble blending for two minutes. Thereafter, the mixture is bar blended for 30 seconds. Tumble blending is then resumed for one minute. Thereafter, Lubritab is combined to the mixture and the entire mixture is tumble blended for an additional five minutes. The resultant mixture is discharged into tablet molds and subjected to high pressure to produce hard tablets. In accordance with standard tablet manufacturing methods in the industry, for producing dry water soluble or dispersible tablets, such as dry chlorine tablets, the mixture is compressed from 2.2" in height to 1" in height, producing 120 gram tablets.

In the above example, the referred to preblend is a mixture prepared for convenience and dilution purposes to provide an even distribution of ingredients, and particularly the active ingredients. The preblend contains 1% liquid chlorpyrifos. In the entire composition, chlorpyrifos is present in the amount of between 0.05% to 2% by weight. Triple superphosphate, in the preblend, is primarily calcium phosphate produced by the action of phosphoric acid on phosphate rock.

The composition of Example 1 was tested for rate of disintegration, wherein it was determined that the application rate of pounds of nitrogen ranged between 0.25 to 2.5 lbs per 1,000 square feet. The actual weight of tablets required for the above range varies from 1 lb. (4 tablets) to 10 lbs. (40 tablets) depending on the level of nitrogen required.

Another example of the composition of the present invention is as follows:

EXAMPLE 2

| Component | Weight % | Comments |
|---|---|---|
| Calcium carbonate | 12.0% | Milled 1–4, –30 mesh. |
| Ammonium sulfate | 25.0% | Commercial grade |
| Potassium sulfate | 25.0% | Commercial grade |
| Ca Tripolyphosphate | 16.0% | Commercial grade |
| Dicalcium phosphate (DH) | 10.8% | Preblend w. chlorpyrifos |
| Chlorpyrifos | 0.3% | Commercial grade |
| Methocel A15C | 9.0% | Thoroughly mix |
| Guar Gum | 0.2% | To slow disintegration |
| Talc | 1.5% | Anti-sticking, add later |
| Graphite | 0.2% | Lubricant, add later |
| Total: | 100.0% | |

The above composition is prepared by first mixing all components with the exception of talc and graphite. After thoroughly mixing the first eight components, the talc and graphite are added and mixed by tumble blending. The resultant composition mixture is thereafter deposited in tablet molds and compressed 2.2" in height to 1" in height to yield 120 gram tablets.

The manufactured tablets, comprised of the composition of the present invention, are primarily intended for use in a chemical delivery system of the type including a main water delivery line for directing a pressurized flow of water from a water source to one or more water discharge devices, as commonly found in an irrigation system (e.g., a sprinkler system). An air tight chamber is filled with a predetermined amount of the dry, water dispersible tablets. A water input line connects from a first location along a main water delivery line to the chamber containing the tablets, and a water output line connects from the chamber to a second location along the main water delivery line. The pressure of water flowing through the main water delivery line is higher at the first location than at the second location, causing a portion of the water flow to be diverted through the input line, into the chamber, through the output line, and feeding back into the main water delivery line at the second location. As water flows through the chamber, the dry water dispersible tablets, containing the composition of the present invention, gradually disintegrate causing a slow, controlled release of the N—P—K fertilizer and insecticide into the water flowing through the main water delivery line. This mixture is then directed to one or more discharge devices (e.g., sprinkler heads, spray nozzles, remote sprinklers, and the like) for application onto plant life, including lawns, plants, and botanicals.

While the instant invention has been described in accordance with various preferred embodiments thereof, it is recognized that departures may be made within the spirit and scope of the present invention which, therefore, should not be limited except as defined by the following claims as interpreted under the doctrine of equivalents.

Now that the invention has been described,

What is claimed is:

1. A fertilizer composition comprising:

a first component consisting of ammonium sulfate, potassium sulfate, calcium phosphate monobasic, ammonium phosphate, said first component being present in an amount of between 10.0 to 40.0% by weight of the composition;

calcium carbonate in an amount of between 9.0 to 15.0% by weight of the composition; and 0,0-diethyl 0-3,5,6-trichloro-2-pyridyl phosphorothioate in an amount of between 0.05% to 2.0% by weight of the composition.

* * * * *